United States Patent
Bobak et al.

(10) Patent No.: US 6,487,580 B1
(45) Date of Patent: *Nov. 26, 2002

(54) METHOD AND SYSTEM FOR MANAGING CONCURRENTLY EXECUTABLE COMPUTER PROCESSES

(75) Inventors: Roman Anthony Bobak, Wappingers Falls, NY (US); David Lee Meck, Hyde Park, NY (US); John Thomas Schmidt, Madison, WI (US); Mythili Venkatakrishnan, Wappingers Falls, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1037 days.

(21) Appl. No.: 08/533,468

(22) Filed: Sep. 25, 1995

(51) Int. Cl.$^7$ ................................................. G06F 9/52
(52) U.S. Cl. ....................................................... 709/106
(58) Field of Search ........................ 709/106, 100–105, 709/107, 108

(56) References Cited

U.S. PATENT DOCUMENTS

| | | | | |
|---|---|---|---|---|
| 5,093,916 A | * | 3/1992 | Karp et al. | ................. 395/700 |
| 5,305,455 A | * | 4/1994 | Anschuetz et al. | ......... 395/700 |
| 5,448,732 A | * | 9/1995 | Matsumoto | .................. 395/650 |
| 5,452,461 A | * | 9/1995 | Vmekita et al. | ............. 395/700 |
| 5,594,901 A | * | 1/1997 | Andoh | ......................... 395/674 |
| 5,623,666 A | * | 4/1997 | Pike et al. | .................... 395/616 |

OTHER PUBLICATIONS

"Toward a method of object–oriented Concurrent Programming", Caromel, Denis, communications of the ACM Sep. 93, v 36, n9, p90.*

* cited by examiner

Primary Examiner—St. John Courtenay, III
(74) Attorney, Agent, or Firm—Floyd A. Gonzalez, Esq.; Marc A. Ehrlich, Esq.; Heslin Rothenberg Farley & Mesiti P.C.

(57) ABSTRACT

A management facility for managing concurrently executable computer processes. The management facility includes a registration mechanism, which enables a plurality of interdependent processes to be considered a part of a topology of logically dependent execution groups, and a termination synchronization mechanism that synchronizes the completion of termination for the processes within the topology. Termination synchronization prevents a process within the topology from completely terminating, even if it has entered normal termination, until all of the processes within the topology have normally terminated. If one of the processes within the topology has abnormally terminated, then notification of this abnormal termination can be propagated to all of the processes within the topology of logically dependent execution groups, since none of them have completely terminated.

72 Claims, 3 Drawing Sheets

METHOD AND SYSTEM FOR MANAGING CONCURRENTLY EXECUTABLE COMPUTER PROCESSES

TECHNICAL FIELD

This invention relates, in general, to concurrent data processing and, in particular, to managing a set of concurrently executable interdependent computer processes.

BACKGROUND ART

Concurrent processing is instrumental in significantly reducing the time it takes to perform a particular job or function, and it is an important aspect in today's computing environments. However, there has been some reluctance, especially in critical business situations, to accept and use concurrent processing. This reluctance is caused by the potential for corrupt data.

For example, in parallel processing environments, data is transferred between processes and modified along the way (e.g., along the pipeline, which is defined as a set of processes together with the data paths between the processes). Errors in one process may affect the integrity of the data that is produced (e.g., output) or consumed (e.g., accepted) by another process at a later point in time. Since the processes handle data in parallel, they may not know of an error that occurred in a particular stage of execution of another process. Thus, there is a potential for data corruption.

A specific example of when data corruption can arise is when processes within a pipeline start and finish at widely varying times. In this scenario, at the time of error, some processes in the pipeline may be just starting, some may be in the midst of processing, and others may have finished pipeline processing and be in termination phases. These processes may all be handling related data in parallel, so errors in processes in any phase (e.g., initiation, process or termination) may affect other processes, regardless of the phase of execution. If a process is not aware of the error, data corruption can occur.

As another example, processes may continue with non-pipeline related processing after disconnecting from or closing a connection to the pipeline (i.e., closing a connection to a resource (e.g., a pipe) of the pipeline). However, these processes still may be affected by errors that occur during pipeline related processing of other processes. Thus, if these processes are not aware of the errors, their data may be corrupted.

Previously, processes that terminated would not know of errors that occurred during execution of other related processes. This caused potential data corruption, thereby, forestalling the widespread use of concurrent processing. Therefore, a need exists for a facility to ensure data integrity. In particular, a need exists for a facility that will notify each related process, whether terminated or not, of an error that occurred with another related process. A further need exists for a mechanism to build a group of related processes, and to be able to dynamically change the group of processes. A yet further need exists for providing synchronization at termination, such that all of the processes of the related group learn of any errors. A further need exists for a mechanism that allows synchronization at initiation, so that processes will not complete before others have begun, thus, having a potential for corrupt data.

SUMMARY OF THE INVENTION

The shortcomings of the prior art are overcome and additional advantages are provided through the provision of a method for managing concurrently executable processes. A plurality of interdependent processes are registered as a topology of one or more logically dependent execution groups, and completion of the plurality of interdependent processes is synchronized. The plurality of interdependent processes is prevented from completing termination until the interdependent processes terminate successfully or until a condition relating to one of the interdependent processes is detected. As one example, the condition is an abnormal termination.

In another aspect of the present invention, a system for managing concurrently executable processes is provided. The system includes means for registering a plurality of interdependent processes as a topology of one or more logically dependent execution groups, and means for synchronizing completion of the interdependent processes. Completion is synchronized such that complete termination of the plurality of interdependent processes is prevented until all of the processes successfully terminate or until a condition relating to one of the processes is detected.

The management facility of the present invention advantageously enables the grouping of interdependent processes and the management of that group of processes. In accordance with the principles of the present invention, no process within the group of processes completely terminates successfully until all of the other processes within the group terminates normally. If an abnormal termination occurs within the group of processes, then since none of the processes has completely terminated, the processes of the group are notified of the abnormal condition, and in one example, are not permitted to terminate successfully. In one embodiment of the invention, either all of the processes within a group terminate successfully or they all fail. This ensures the integrity of the data processed by the group of processes.

In addition to the above, the management facility of the present invention advantageously allows the group of processes to be dynamically changed, so that all of the interdependent processes can be assured of data integrity.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, interdependent processes are managed as one unit, i.e., one topology of logically dependent execution groups. As one example, a topology includes one or more logically dependent execution groups, each of which includes one or more interdependent processes. The interdependency may be, for example, a data dependency, a scheduling dependency or any other dependency that relates the processes to one another.

In accordance with the principles of the present invention, since the topology is managed as one unit, if one of the processes of the topology enters successful termination, it will not complete termination until all of the processes within the topology terminate successfully. Additionally, in one example, if one of the processes within the topology fails, then they all fail. In other words, termination is synchronized for the entire topology of logically dependent execution groups.

Termination synchronization enables each process within the topology, even those that have already entered normal termination, to receive notification of an abnormal termination (i.e., e.g., an error or any other condition that is considered abnormal or undesired for the particular process). Processes that arrive later are assured that no other processes of the topology have completely terminated, so an abnormal termination can be propagated to all of the processes. This ensures data integrity and makes it possible for wider use of parallel and/or distributed processing.

In addition to termination synchronization, in one embodiment, the management facility of the present invention provides for initiation (or initial) synchronization. Initiation synchronization ensures that a minimum number of processes to be included in a particular logically dependent execution group of the topology are at initial synchronization stage prior to processing of the processes within the topology. This is advantageous in those situations in which processes begin processing at widely varying times. It enables processes that have an early start time to be included in the termination synchronization, described above.

The management facility of the present invention also provides the ability to dynamically change the topology of logically dependent execution groups, so that additional processes may be included in the termination synchronization. The management facility of the present invention preserves data integrity, timely recovery from abnormal terminations, flexibility in execution and parallelism.

Figure 1:
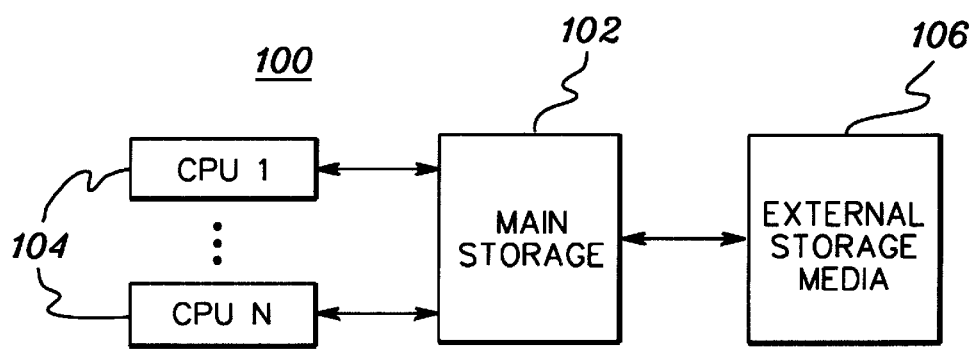
FIG. 1 depicts one example of a computer system incorporating and using the management facility of the present invention.

In one embodiment, the management facility of the present invention is incorporated and used in a computer system 100 (FIG. 1). In one example, computer system 100 is designed following the Enterprise Systems Architecture (ESA)/390 offered by International Business Machines Corporation (e.g., an ES/9000 Model 982). Enterprise Systems Architecture/390 is described in detail in "Enterprise Systems Architecture/390 Principles of Operation," Publication Number SA22-7201-02, Third Edition (February 1995), which is offered by International Business Machines Corporation, and is hereby incorporated herein by reference in its entirety. (ESA/390 is a trademark of International Business Machines Corporation.)

As shown in FIG. 1, computer system 100 includes, for example, a main storage 102, one or more central processing units (CPUs) 104 and one or more external storage medium 106. Each of these components is described in detail below.

Central processing units 104 contain the sequencing and processing facilities for instruction execution, interruption action, timing functions, initial program loading and other machine related functions. In one embodiment, one or more of central processing units 104 executes an operating system, such as, for example, the Multiple Virtual Storage (MVS)/ESA operating system, offered by International Business Machines Corporation. (MVS/ESA is a trademark of International Business Machines Corporation.) As is known, MVS/ESA controls the execution of programs running within the system and the processing of data. Additionally, in accordance with the principles of the present invention, MVS/ESA also controls the management facility of the present invention.

One or more subsystems can run under the control of MVS/ESA. One example of a subsystem running on MVS/ESA and incorporating the management facility of the present invention is IBM BatchPipes/MVS (hereinafter referred to as BatchPipes). BatchPipes is described in detail in "BatchPipes/MVS", Publication Number GC28-1215-00, First Edition, June 1994, which is offered by International Business Machines Corporation, and is hereby incorporated herein by reference in its entirety. (IBM and BatchPipes/MVS are trademarks of International Business Machines Corporation.)

Central processing units 104 are coupled via, for example, one or more bi-directional buses to main storage 102. Main storage 102 is directly addressable and provides for high-speed processing of data by the central processing units. Main storage 102 can be physically integrated with the CPUs or constructed as stand-alone units.

Main storage 102 is further coupled via, for instance, a bi-directional bus to external storage media 106. External storage media 106 may include, for instance, direct access storage devices (DASD), magnetic tapes, diskettes, and/or optical devices, to name a few.

The above-described computer system is only one example of an environment which can incorporate and use the management facility of the present invention. The management facility of the present invention can be incorporated in and used with many other computer systems having a wide variety of platforms. For example, the management facility of the present invention can be used with computer complexes in which a plurality of those systems depicted in FIG. 1 are coupled together, or it can be used in client/server systems or any other systems supporting parallel and/or distributed processing of various interdependent processes. The management facility of the present invention can be used with processes executing within one system, across many systems, or across networks.

Figure 2:
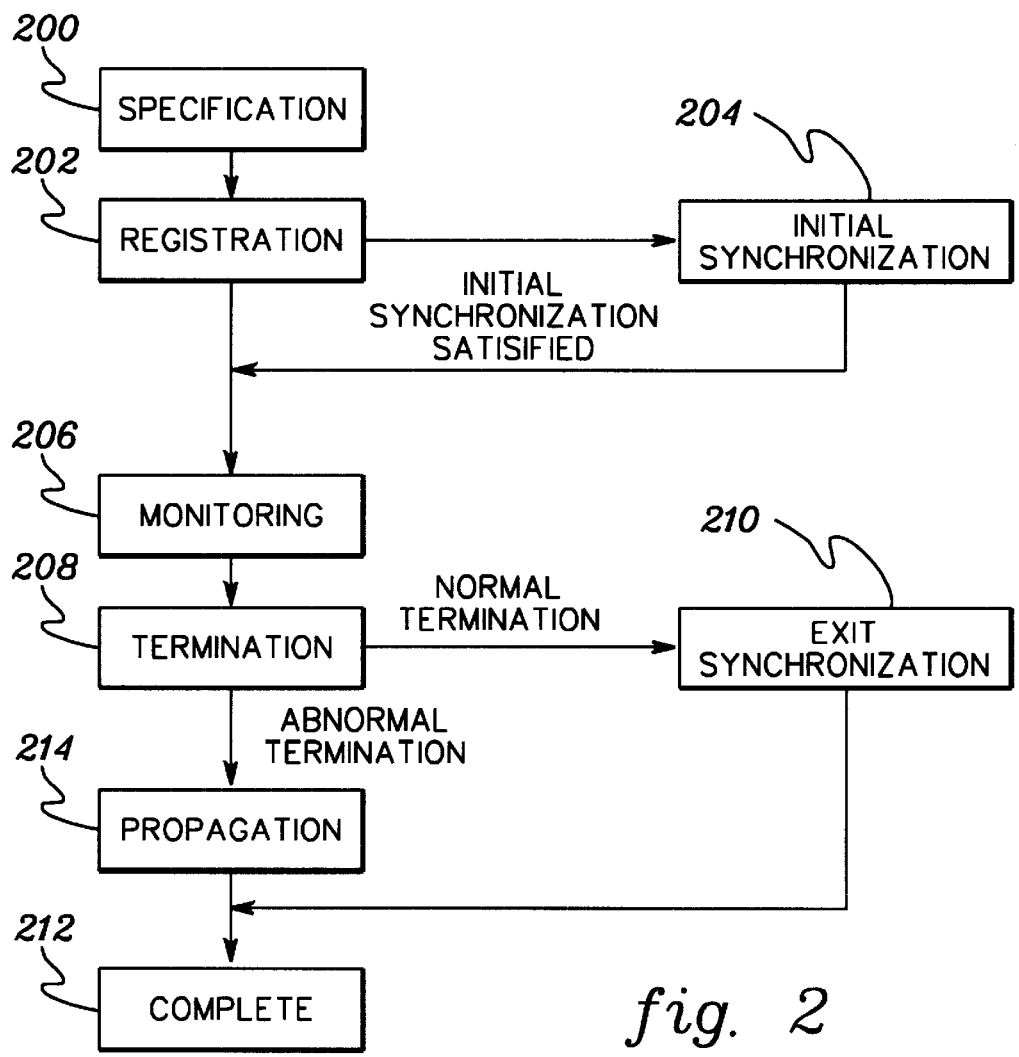
FIG. 2 depicts one embodiment of a flow diagram of one example of the management facility of the present invention.

One embodiment of the logic associated with one example of the management facility of the present invention is described in detail herein with reference to FIG. 2. The example described herein refers to BatchPipes and services provided by MVS/ESA. This is only one example. It will be apparent to those of ordinary skill in the art, that other operating systems, subsystems, and or services can be used to perform the functions of the present invention. These are, therefore, considered a part of the claimed invention.

Referring to FIG. 2, in one example, initially, a process (i.e., a task or logical unit of work) indicates that synchronization is desired for a specific logically dependent execution group and/or the topology of logically dependent execution groups, STEP 200 "SPECIFICATION." For example, a process indicates that initialization and/or termination synchronization is desired for the process. In one embodiment of the present invention, processes within a logically dependent execution group are data dependent. Thus, the processes within the logically dependent execution group share a common resource, such as, for instance, a pipe. As is known, a pipe is, for instance, a communication medium through which two or more processes can transfer data. Data dependency is only one embodiment. As described above, the dependency can be a scheduling dependency or any other dependency desired to relate the processes of a logically dependent execution group.

In one particular implementation in which the dependency is a data dependency (and using BatchPipes), specification is accomplished by adding, for instance, one or more subparameters to the SUBSYS parameter of a data definition (DD) statement. For example, if initiation synchronization is desired for a particular logically dependent execution group, then a subparameter, referred to as an allocation synchronization (AllocSync or AS) keyword, defined in accordance with the principles of the present invention, is added to the DD statement. The allocation synchronization subparameter specifies the minimum number of processes that are required to allocate a given resource before any processing continues for that resource. The number specified represents the total number of processes for that resource, and it can be a different number for each of the resources of the computer system. If allocation synchronization is requested, then all processes allocating to that resource wait in allocation until the specified number of processes is reached. Therefore, if AllocSync is specified for all of the resources within a topology, then all the processes within the topology will wait in allocation until all of the allocation synchronizations are satisfied. This helps ensure that notification of an abnormal termination of one of the processes within the topology (assuming termination synchronization) includes all of the processes within the topology, even if their time of allocation varies significantly.

In accordance with the principles of the present invention, the first process to allocate a resource establishes whether the resource is an allocation synchronization (AS) resource, and the number of allocations required for allocation to complete. In one embodiment, all processes allocated to the resource must have the same specification as the original process. For example, if the first process specifies 'AS=2', indicating that the minimum number of processes is two, then all of the subsequent processes allocating to the resource also indicate that 'AS=2', even if there are greater than two processes. If a process specifies an AllocSync value that does not match, the offending process fails, but the other processes do not.

In another embodiment of the invention, the specification of a process' intent to participate in initiation synchronization can be provided by an event external to and independent of the process. That is, a mechanism other than the JCL (job control language) DD statement described above can be used.

The forcing of processes to remain in the allocation phase until at least a minimum number of processes have been allocated may cause system resource contention. Thus, a mechanism has been developed, in accordance with the principles of the present invention, to alleviate this contention. This mechanism is referred to, for instance, as allocate now (AllocNow), and is used to indicate that a connection to a resource may count towards the AllocSync number, but it does not wait during allocation for the AllocSync number to be reached. In one example, allocate now is specified as a subparameter (AN) on the SUBSYS DD statement. If there are multiple allocations in one process for an allocation synchronized resource, and some of the DD statements have AllocNow and others do not, then the allocation synchronization counts are adjusted. However, the process will wait until initiation synchronization is satisfied before it continues processing.

In addition to a process specifying its intent to participate in initiation synchronization, a process can also specify its intent to participate in termination synchronization. In accordance with the principles of the present invention, termination synchronization is used to prevent the processes of a topology of logically dependent execution groups from completing termination until all of the processes have successfully terminated or until a condition, such as abnormal termination, is detected for one of the processes. In one embodiment of termination synchronization, if one of the processes abnormally terminates, then all of the processes within the topology will complete termination unsuccessfully, even if one or more of the processes entered normal termination.

In one example, termination synchronization is requested by adding a subparameter to the SUBSYS parameter of a data definition (DD) statement. The subparameter is, for instance, TS. When TS is specified on the DD statement, then the first process in a pipeline (e.g., a topology of logically dependent execution groups) establishes whether the entire pipeline is a TS pipeline. In one embodiment, all processes in the topology must have the same specification as the original process. If a process' specification does not match, then the offending process, but not the other processes, is abnormally terminated. In other embodiments, the specification can be different for one or more processes, thereby, allowing termination synchronization to be specified for individual logically dependent execution groups and/or for individual processes.

One example of the JCL used to invoke the initiation and termination synchronizations of the present invention for two processes (a read and a write process) is depicted below:

```
//IBMUSR JOB ,MSGLEVEL=(1,1),USER=IBMUSER,CLASS=A,
// MSGCLASS=A
//JOBLIB DD DISP=SHR,DSN=TEST.LOAD
//OPENIR EXEC PGM=SMPIPE,PARM='R,0002'
//SYSUDUMP DD SYSOUT=*
//ONLYDD DD DSN=IBMUSER.TEST
//         SUBSYS=(BP02,TS,'AS=2'),
//         RECFM=F,LRECL=80
//IBMUSW JOB ,MSGLEVEL=(1,1),USER=IBMUSER,CLASS=A,
//MSGCLASS=A
//JOBLIB DD DISP=SHR, DSN=TEST.LOAD
//OPENIW EXEC PGM=SMPIPE,PARM='W,0000'
//SYSUDUMP DD SYSOUT=*
//ONLYDD DD DSN=IBMUSER.TEST,
//         SUBSYS=(BP02,TS,'AS=2'),
//         RECFM=F,LRECL=80
```

The JCL in the above example is standard JCL known to those of ordinary skill in the art. The SUBSYS parameter is highlighted for clarity herein. Note that the SUBSYS parameter, in this particular example, includes three subparameters (two of which have been added in accordance with the principles of the present invention): the subsystem name, which, in this instance, is BPO2 for BatchPipes; the termination synchronization subparameter (TS); and the allocation synchronization subparameter ('AS=2').

As described above, the specification mechanism of the present invention is used by the processes to indicate their intent to participate in the management facility, and in particular, in synchronization of the present invention. However, in order to participate in synchronization (i.e., initiation and/or termination synchronization), each process needs to be registered as part of a logically dependent execution group and/or as part of a topology, STEP 202 "REGISTRATION."

In one particular embodiment in which the processes are related by a data dependency, a process registers with a logically dependent execution group (and therefore, a topology, as described below) by specifying the name of the logically dependent execution group in a registration token. In one example, the registration token is created during allocation of the subsystem DD statements, and it includes the subsystem name combined with the name of a resource (e.g., a dataset name). For example, referring to the above-referenced JCL, the name of the logically dependent execution group stored within the registration token is BP02.IBMUSER.TEST.

Figure 3:
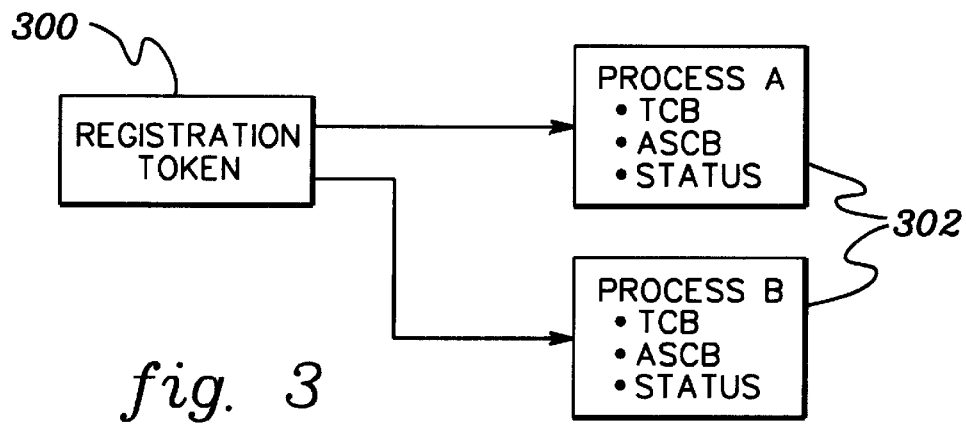
FIG. 3 illustrates one example of a control block chain created, in accordance with the principles of the present invention, to identify one example of the processes registered with a particular logically dependent execution group.

During registration, a structure, such as, for example, a control block chain, is built for each logically dependent execution group. As illustrated in FIG. 3, a control block 300 is created, which includes the registration token. Additionally, one or more subordinate control blocks 302 is created and chained to control block 300 for each of the processes registered to the resource. Each of the subordinate control blocks includes, for instance, the process name, attributes that define the process (e.g., task control block (TCB) and address space control block (ASCB), to name a couple) and the status of the process (e.g., wait, terminating, completing terminating, etc.).

Returning to FIG. 2, if, during specification, the process indicates that it intends to participate in initiation synchronization, then after the process is registered with a logically dependent execution group, initiation synchronization commences. During initiation synchronization, the processes are synchronized during the allocation phases of the processes, STEP 204 "INITIAL SYNCHRONIZATION." Synchronization is satisfied when each process specifying AllocSync (in the BatchPipes implementation) has arrived at its initial stage.

When initiation synchronization is satisfied, each process within a topology of logically dependent execution groups is monitored for termination, STEP 206 "MONITORING." In one example, this condition is monitored by BatchPipes using a resource manager added via the MVS RESMGR service during the registration phase. MVS RESMGR is a known MVS service, which is described in detail in MVS/ESA Programming: Authorized Assembler Services Reference, Volume 3 (LLACOPY-SDUMPX), Document Number GC28-1477-00, First Edition, June 1994, offered by International Business Machines Corporation, and hereby incorporated herein by reference in its entirety. When a process within the topology terminates, it can terminate normally (e.g., a successful completion of a task) or abnormally (e.g., unsuccessful or undesired completion of a task), STEP 208 "TERMINATION." In one embodiment, a resource manager of the process monitors the termination and handles the termination for the process. Specifically, in one example, the BatchPipes resource manager for the process handles the monitoring, termination, exit synchronization and propagation, as described herein.

In particular, in one example, when a process enters normal termination, the resource manager prevents the process from completing termination until all of the other processes within the topology have terminated normally or until a prespecified condition is detected, as described below. In one specific example, during monitoring, the resource manager of the normally terminated process, builds a graph of the processes of the topology. For instance, the resource manager determines from the resource token(s) the processes that are registered for it. After determining the resource(s), the resource manager determines all of the other processes using those resources and includes those processes in the graph. This is repeated for all of the processes in the graph. When the graph is complete, the resource manager knows what processes have been registered (and are therefore, a part of a logically dependent execution group) and which are included in the topology. The resource manager can then determine the status of the processes. If the other processes have not reached termination, then the resource manager prevents its process from completing termination.

In one example, in order to prevent the process from completing termination, the resource manager invokes a known MVS service, referred to as WAIT, which causes the normally terminated process to remain in a waiting state, STEP 210 "EXIT SYNCHRONIZATION." WAIT is described in detail in MVS/ESA Programming: Authorized Assembler Services Reference, Volume 4 (SETFRR-WTOR), Document Number GC28-1478-00, First Edition, June 1994, offered by International Business Machines Corporation, and hereby incorporated herein by reference in its entirety.

During exit synchronization, each process of the topology that terminates normally waits for all of the other processes of the topology to do the same or for any notification of an error or other condition. The last process of the topology to terminate satisfies the synchronization, and termination can then complete for the entire topology of logically dependent execution groups, STEP 212 "COMPLETE," as described in detail below.

If during monitoring of the processes within a topology of logically dependent execution groups, the monitor (e.g., a BatchPipes resource manager) detects that a process has terminated abnormally, then exit synchronization is bypassed and notification of the abnormal termination is propagated to all of the members of the topology, STEP 214 "PROPAGATION." In particular, the resource manager for the abnormally terminated process determines, in a manner described above, the processes that are part of the topology, and then propagates notification of the abnormal termination and/or the abnormal termination to each of the processes within the topology.

In one example, forward, backward and lateral propagation of the abnormal termination takes place such that all of the processes, including those that have terminated normally and are in exit synchronization, and those that have registered but have not begun processing as of yet, receive notification and/or propagation of the abnormal termination. As defined herein, forward propagation includes propagating to a process that has a logical dependency on the abnormally terminated process; backward propagation is propagating to a process in which the abnormally terminated process has a logical dependency on; and lateral propagation is propagating to a process that does not have a direct dependency on the abnormally terminated process, but does have a dependency on one of the other processes within the topology.

Figure 4:
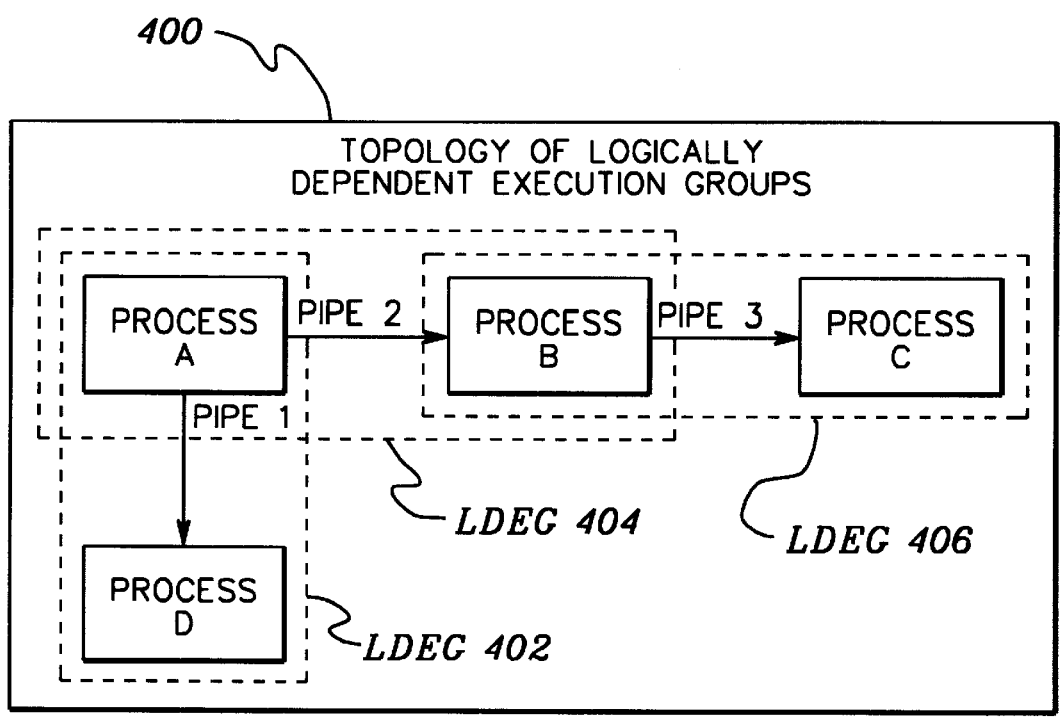
FIG. 4 depicts one example of a topology of logically dependent execution groups to be managed by the management facility of the present invention.

An example of forward, backward and lateral propagation is described herein with reference to FIG. 4. Referring to FIG. 4, a topology of logically dependent execution groups 400 is depicted. In one example, topology 400 includes three logically dependent execution groups (LDEG): LDEG 402, which includes Process A, Process D and Pipe 1; LDEG 404, which includes Process A, Process B and Pipe 2; and LDEG 406, which includes Process B, Process C and Pipe 3. If Process B of logically dependent execution group 404 abnormally terminates, then the abnormal termination would be forward propagated to Process C, backwardly propagated to Process A, and laterally propagated to Process D.

In one embodiment, if one of the processes within a topology of logically dependent execution groups abnormally terminates, then the BatchPipes resource manager for the abnormally terminating process causes all of the other processes of the topology to fail. In one example, this is accomplished by issuing a request to MVS (e.g., CALLRTM) to abnormally terminate each process. (CALLRTM is a known MVS service, which is described in detail in MVS/ESA Programming: Authorized Assembler Services Reference, Volume 1 (ALESERVDYNALLOC), Document Number GC28-1475-00, First Edition, June 1994, offered by International Business Machines Corporation, and hereby incorporated herein by reference in its entirety.)

Returning again to FIG. 2, in one embodiment, when all of the processes within a topology of logically dependent execution groups have terminated, either successfully (exit synchronization) or unsuccessfully (propagation), then termination is complete for the topology and for each of the processes within the topology, STEP 212 "COMPLETE." In one example, if all of the processes of the topology terminate successfully, then the topology completes successfully. In particular, as one example, when the last process terminates normally, the BatchPipes resource manager for the terminating process invokes a known MVS service, referred to as POST, for each of the other processes in the topology that are waiting in exit synchronization. The POST allows the waiting processes to complete termination. POST is described in detail in MVS/ESA Programming: Authorized Assembler Services Reference, Volume 3 (LLACOPY-SDUMPX), Document Number GC28-1477-00, First Edition, June 1994, offered by International Business Machines Corporation, and hereby incorporated herein by reference in its entirety.

If, however, one of the processes within the topology abnormally terminates, then all of the processes within the topology also terminate abnormally. This ensures data integrity. In the BatchPipes implementation of the invention, completion occurs when the resource manager exits and allows MVS to end the application or job.

It will be apparent to those of ordinary skill in the art that the above-described dataflow is only one example. There can be many variations to the above, including, for instance, processing more or less than the functions described above, or changing the order of some of the functions without departing from the spirit of the invention. These variations are therefore, considered a part of the claimed invention.

As one alternative embodiment of the invention, each process of a topology registers with the topology by specifying a topology name (which is distinct from a resource name) in the registration token. Thus, any process specifying the topology name in the registration token is considered a part of the topology. In this embodiment, all of the processes of the topology would be considered a part of the same logically dependent execution group. That is, the topology and the logically dependent execution group are one in the same. Other embodiments are also possible and are considered a part of the claimed invention.

Figure 5:
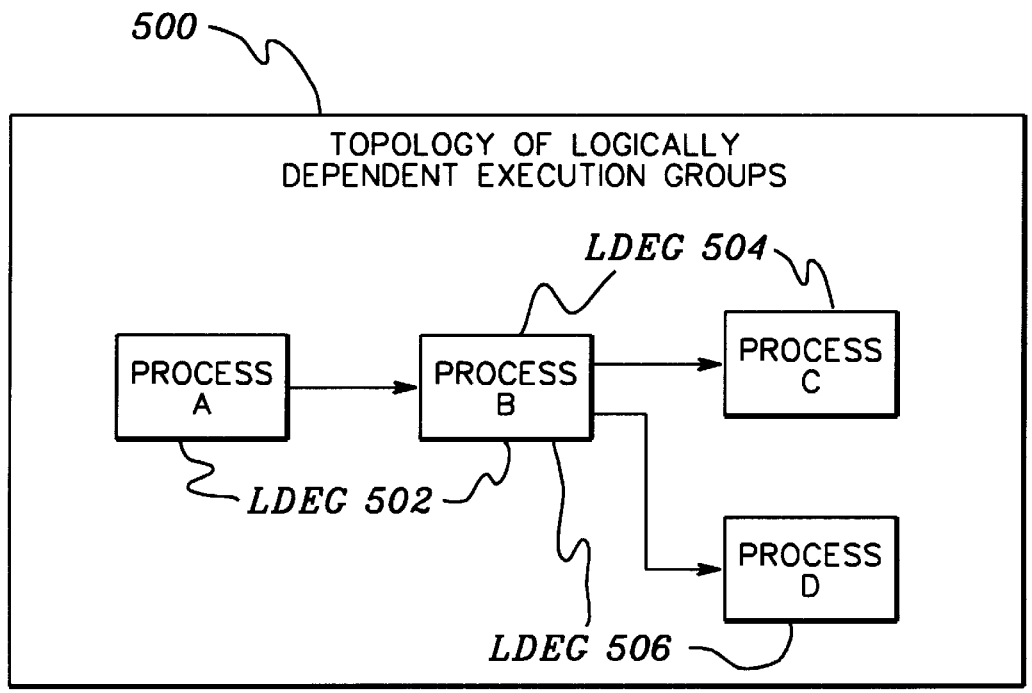
FIG. 5 illustrates another example of a topology of logically dependent execution groups to be managed by the management facility of the present invention.

In addition to the above, the management facility of the present invention allows dynamic updates to a topology of logically dependent execution groups. Specifically, the topology can be updated to include other processes, which will be included in the termination synchronization. As one example, a topology of logically dependent execution groups 500 (FIG. 5) is depicted in FIG. 5. In this particular example, topology 500 includes three logically dependent execution groups (LDEG): LDEG 502 which includes, for instance, Process A and Process B; LDEG 504 which includes, for instance, Process B and Process C; and LDEG 506 which includes, for instance, Process B and Process D. Therefore, the topology includes four processes, Process A, Process B, Process C and Process D.

Figure 6:
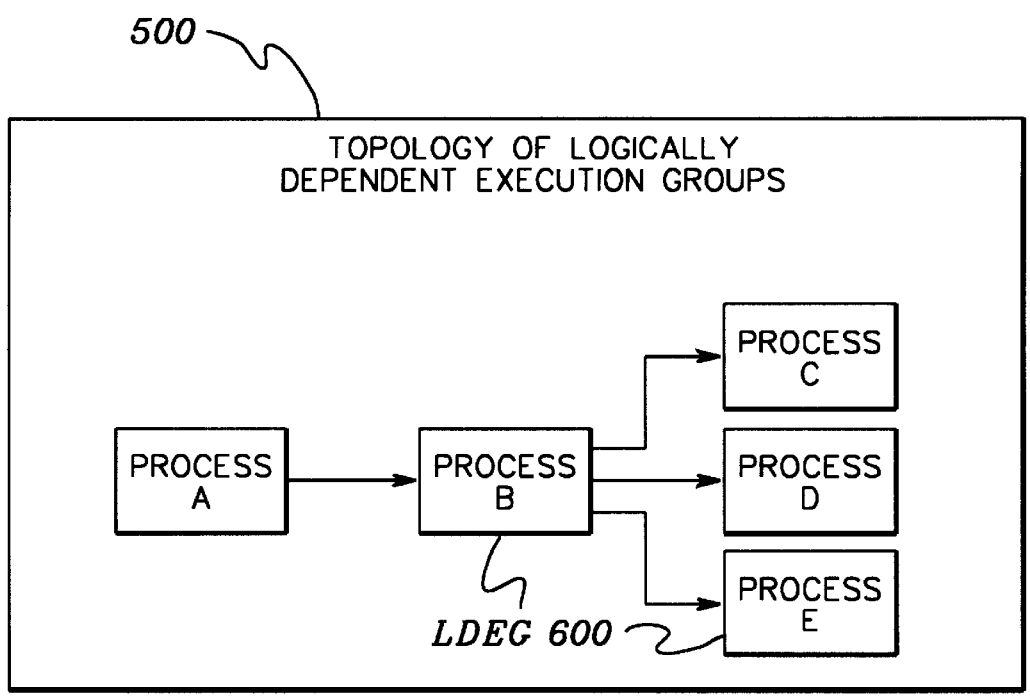
FIG. 6 illustrates one example of adding a process to the topology of logically dependent execution groups of FIG. 5, in accordance with the principles of the present invention.

In accordance with the principles of the present invention a fifth process, Process E, (FIG. 6) can be added to topology 500. Process E becomes a part of the topology and participates in termination synchronization. Specifically, it will receive notification of an abnormal termination of any process within the topology. In one example, Process E is dynamically added to the topology by registering the additional process with a particular logically dependent execution group (either an existing group or a new group not already specified in the topology). In this example, Process E is added to a new logically dependent execution group 600.

In accordance with the principles of the present invention, an update to the topology can occur at any time up until the time at which the topology terminates completely.

The management facility described in detail above allows, for example, the detection and propagation of abnormal terminations in a parallel and/or distributed environment through an initial process or client registration, along with synchronization of the initiating and termination phases of processing. The facility is usable with any computing platform that allows parallel, distributed or concurrent execution of multiple interdependent processes. The facility provides data integrity across a topology of logically dependent execution groups, allows abnormal terminations (such as errors) to be detected in a timely manner, regardless of the execution phase (i.e., initiation, processing and terminating) of a process, and allows for an entire topology to be notified of the abnormal termination, regardless of the execution phase of each process within the topology. The management facility of the present invention provides the above advantages without sacrificing parallelism. During the processing phase of the topology, processes can produce and consume concurrently. No synchronization takes place during the processing phase.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for managing concurrently executable computer processes, said method comprising:

registering a plurality of processes as a logically dependent execution group; and synchronizing completion of a termination phase of said plurality of processes, wherein each process of said plurality of processes is prevented from completing said termination phase until one of the following conditions is satisfied:

(a) each process of said plurality of processes enters said termination phase signifying normal termination of processing for each process of said plurality of processes; and (b) an abnormal termination for one process of said plurality of processes is detected.

2. The method of claim 1, wherein said registering comprises:

creating a registration token for said logically dependent execution group; and associating said plurality of processes with said registration token.

3. The method of claim 2, wherein said creating comprises storing a name of a resource allocated by said plurality of processes in said registration token.

4. The method of claim 1, further comprising specifying by one process of said plurality of processes that termination synchronization is desired for said logically dependent execution group.

5. The method of claim 4, wherein said specifying comprises using a data definition statement to indicate said termination synchronization, said data definition statement comprising a termination synchronization indication.

6. The method of claim 5, wherein said specifying comprises indicating by each of said plurality of processes that termination synchronization is desired, said indicating comprising using an associated data definition statement for each of said plurality of processes.

7. The method of claim 1, further comprising completing termination of said plurality of processes.

8. The method of claim 7, wherein said plurality of processes has entered normal termination, and wherein said completing termination comprises successfully completing termination of said plurality of processes.

9. The method of claim 7, wherein said abnormal termination has been detected, and wherein said completing termination comprises causing said plurality of processes to terminate unsuccessfully.

10. The method of claim 7, further comprising adding a process to said plurality of processes registered as said logically dependent execution group, said adding being performed prior to said completing, and wherein said process is synchronizable.

11. The method of claim 1, further comprising monitoring termination of at least one of said plurality of processes, said monitoring comprising determining whether said at least one of said plurality of processes has entered normal termination or has abnormally terminated.

12. The method of claim 1, further comprising propagating at least one of said abnormal termination and notification of said abnormal termination to said plurality of processes when said abnormal termination is detected.

13. The method of claim 12, wherein said propagating comprises propagating to said plurality of processes exclusive of said one process abnormally terminating.

14. The method of claim 13, wherein said propagating comprises forward, backward and lateral propagation.

15. The method of claim 1, further comprising performing initial synchronization for said plurality of processes registered as a logically dependent execution group, said initial synchronization comprising inhibiting processing of said plurality of processes until a predetermined number of processes of said logically dependent execution group has arrived at an initial stage of processing.

16. The method of claim 15, further comprising specifying by one process of said plurality of processes that said initial synchronization is desired for said logically dependent execution group.

17. The method of claim 16, wherein said specifying comprises using a data definition statement to indicate said initial synchronization, said data definition statement comprising a request for allocation synchronization.

18. The method of claim 17, wherein said specifying comprises indicating by each of said plurality of processes that initial synchronization is desired, said indicating comprising using an associated data definition statement for each of said plurality of processes.

19. The method of claim 15, further comprising allowing one or more processes of said plurality of processes to opt out of said initial synchronization, wherein said one or more processes is permitted to be processed prior to said predetermined number of processes arriving at said initial stage of processing.

20. The method of claim 19, wherein said one or more processes is counted towards said predetermined number.

21. The method of claim 1, wherein said registering comprises registering a plurality of processes as a topology of logically dependent execution groups, said topology of logically dependent execution groups comprising one or more logically dependent execution groups.

22. The method of claim 21, further comprising specifying by one process of said plurality of processes that termination synchronization is desired for said topology of logically dependent execution groups.

23. The method of claim 21, wherein said registering comprises:

creating a registration token for each of said one or more logically dependent execution groups; and associating one or more of said plurality of processes with each registration token.

24. The method of claim 21, wherein one group of said one or more logically dependent execution groups comprises at least two processes of said plurality of processes, and further comprising performing initial synchronization for said at least two processes of said one group, said initial synchronization comprising inhibiting processing of said at least two processes until a predetermined number of processes of said one group has arrived at an initial stage of processing.

25. The method of claim 21, further comprising performing initial synchronization for said plurality of processes registered as said topology of logically dependent execution groups, wherein said performing comprises inhibiting processing of said plurality of processes until a predetermined number of processes has arrived at an initial stage of processing.

26. The method of claim 1, wherein said plurality of processes includes processes other than processes that are created from one or more processes.

27. The method of claim 1, wherein said plurality of processes is prevented from completing said termination phase, even when one or more of said plurality of processes is ready to complete said termination phase.

28. A method for managing concurrently executable computer processes, said method comprising:

specifying by one process of a plurality of processes that termination synchronization is desired for a topology of logically dependent execution groups, said topology comprising one or more logically dependent execution groups;

registering said plurality of processes with said topology of logically dependent execution groups;

monitoring termination of at least one of said plurality of processes;

synchronizing completion of a termination phase of said plurality of processes, wherein each process of said plurality of processes is prevented from completing said termination phase until one of the following conditions is satisfied:
(a) said monitoring determines each process of said plurality of processes has entered said termination phase signifying normal termination of processing for each process of said plurality of processes; and
(b) said monitoring detects an abnormal termination for one process of said plurality of processes;
propagating at least one of said abnormal termination and notification of said abnormal termination to said plurality of processes, when said abnormal termination is detected; and
completing termination of said plurality of processes.

29. The method of claim 28, wherein said specifying further comprises specifying by a process of one group of said one or more logically dependent execution groups that initial synchronization is desired for processes of said one group.

30. The method of claim 24, further comprising performing said initial synchronization, said initial synchronization comprising inhibiting processing of said processes of said one group until a predetermined number of processes of said one group has arrived at an initial stage of processing.

31. The method of claim 30, wherein said specifying comprises specifying initial synchronization for said topology, and wherein said performing comprises performing said initial synchronization for said plurality of processes of said topology.

32. The method of claim 28, wherein said plurality of processes has entered normal termination, and wherein said completing comprises successfully completing termination of said plurality of processes.

33. The method of claim 28, wherein said abnormal termination has been detected, and wherein said completing comprises unsuccessfully terminating said plurality of processes.

34. The method of claim 28, wherein said registering comprises:
creating a registration token for said topology of logically dependent execution groups; and
associating said plurality of processes with said registration token.

35. The method of claim 28, wherein said registering comprises:
creating a registration token for each of said one or more logically dependent execution groups; and
associating said plurality of processes with said registration tokens.

36. The method of claim 28, further comprising dynamically changing said topology prior to said completing.

37. The method of claim 36, wherein said dynamically changing comprises adding a process to said topology, said process being added to one of at least one of said one or more logically dependent execution groups and a new logically dependent execution group, and wherein said process participates in said termination synchronization.

38. A method for managing concurrently executable computer processes, said method comprising:
identifying a plurality of processes to be synchronized; and
synchronizing completion of a termination phase of said plurality of processes, wherein each process of said plurality of processes is prevented from completing said termination phase until each process of said plurality of processes enters said termination phase signifying normal termination of processing for each process of said plurality of processes.

39. A system for managing concurrently executable computer processes, said system comprising:
means for registering a plurality of processes as a logically dependent execution group; and
means for synchronizing completion of a termination phase of said plurality of processes, wherein each process of said plurality of processes is prevented from completing said termination phase until one of the following conditions is satisfied:
(a) each process of said plurality of processes enters said termination phase signifying normal termination of processing for each process of said plurality of process; and
(b) an abnormal termination for one process of said plurality of processes is detected.

40. The system of claim 39, wherein said means for registering comprises:
means for creating a registration token for said logically dependent execution group; and
means for associating said plurality of processes with said registration token.

41. The system of claim 39, further comprising means for specifying by one process of said plurality of processes that termination synchronization is desired for said logically dependent execution group.

42. The system of claim 41, wherein said means for specifying comprises a data definition statement to indicate said termination synchronization, said data definition statement comprising a termination synchronization indication.

43. The system of claim 42, wherein said means for specifying comprises means for indicating by each of said plurality of processes that termination synchronization is desired, said means for indicating comprising an associated data definition statement for each of said plurality of processes.

44. The system of claim 39, further comprising means for completing termination of said plurality of processes.

45. The system of claim 44, wherein said plurality of processes has entered normal termination, and wherein said means for completing termination comprises means for successfully completing termination of said plurality of processes.

46. The system of claim 44, wherein said abnormal termination has been detected, and wherein said means for completing termination comprises means for causing said plurality of processes to terminate unsuccessfully.

47. The system of claim 44, further comprising means for adding a process to said plurality of processes registered as said logically dependent execution group, said adding being performed prior to said completing, and wherein said process is synchronizable.

48. The system of claim 39, further comprising means for monitoring termination of at least one of said plurality of processes, said means for monitoring comprising means for determining whether said at least one of said plurality of processes has entered normal termination or has abnormally terminated.

49. The system of claim 39, further comprising means for propagating at least one of said abnormal termination and notification of said abnormal termination to said plurality of processes when said abnormal termination is detected.

50. The system of claim 49, wherein said means for propagating comprises forward, backward and lateral propagation.

51. The system of claim 39, further comprising means for performing initial synchronization for said plurality of processes registered as a logically dependent execution group, said initial synchronization comprising inhibiting processing of said plurality of processes until a predetermined number of processes of said logically dependent execution group has arrived at an initial stage of processing.

52. The system of claim 51, further comprising means for specifying by one process of said plurality of processes that said initial synchronization is desired for said logically dependent execution group.

53. The system of claim 52, wherein said means for specifying comprises a data definition statement to indicate said initial synchronization, said data definition statement comprising a request for allocation synchronization.

54. The system of claim 53, wherein said means for specifying comprises means for indicating by each of said plurality of processes that initial synchronization is desired, said means for indicating comprising an associated data definition statement for each of said plurality of processes.

55. The system of claim 51, further comprising means for allowing one or more processes of said plurality of processes to opt out of said initial synchronization, wherein said one or more processes is permitted to be processed prior to said predetermined number of processes arriving at said initial stage of processing.

56. The system of claim 39, wherein said means for registering comprises means for registering a plurality of processes as a topology of logically dependent execution groups, said topology of logically dependent execution groups comprising one or more logically dependent execution groups.

57. The system of claim 56, further comprising means for specifying by one process of said plurality of processes that termination synchronization is desired for said topology of logically dependent execution groups.

58. The system of claim 56, wherein said means for registering comprises:
means for creating a registration token for each of said one or more logically dependent execution groups; and
means for associating one or more of said plurality of processes with each registration token.

59. The system of claim 56, wherein one group of said one or more logically dependent execution groups comprises at least two processes of said plurality of processes, and further comprising means for performing initial synchronization for said at least two processes of said one group, said initial synchronization comprising inhibiting processing of said at least two processes until a predetermined number of processes of said one group has arrived at an initial stage of processing.

60. The system of claim 56, further comprising means for performing initial synchronization for said plurality of processes registered as said topology of logically dependent execution groups, wherein said means for performing comprises means for inhibiting processing of said plurality of processes until a predetermined number of processes has arrived at an initial stage of processing.

61. A system for managing concurrently executable computer processes, said system comprising:
means for specifying by one process of a plurality of processes that termination synchronization is desired for a topology of logically dependent execution groups, said topology comprising one or more logically dependent execution groups;
means for registering said plurality of processes with said topology of logically dependent execution groups;
means for monitoring termination of at least one of said plurality of processes;
means for synchronizing completion of a termination phase of said plurality of processes, wherein each process of said plurality of processes is prevented from completing said termination phase until one of the following conditions is satisfied:
  (a) said means for monitoring determines each process of said plurality of processes has entered said termination phase signifying normal termination of processing for each process of said plurality of processes; and
  (b) said means for monitoring detects an abnormal termination for one process of said plurality of processes;
means for propagating at least one of said abnormal termination and notification of said abnormal termination to said plurality of processes, when said abnormal termination is detected; and
means for completing termination of said plurality of processes.

62. The system of claim 61, wherein said means for specifying further comprises means for specifying by a process of one group of said one or more logically dependent execution groups that initial synchronization is desired for processes of said one group.

63. The system of claim 62, further comprising means for performing said initial synchronization, said initial synchronization comprising inhibiting processing of said processes of said one group until a predetermined number of processes of said one group has arrived at an initial stage of processing.

64. The system of claim 63, wherein said means for specifying comprises means for specifying initial synchronization for said topology, and wherein said means for performing comprises means for performing said initial synchronization for said plurality of processes of said topology.

65. The system of claim 61, wherein said plurality of processes has entered normal termination, and wherein said means for completing comprises means for successfully completing termination of said plurality of processes.

66. The system of claim 61, wherein said abnormal termination has been detected, and wherein said means for completing comprises means for unsuccessfully terminating said plurality of processes.

67. The system of claim 61, wherein said means for registering comprises:
means for creating a registration token for said topology of logically dependent execution groups; and
means for associating said plurality of processes with said registration token.

68. The system of claim 61, wherein said means for registering comprises:
means for creating a registration token for each of said one or more logically dependent execution groups; and
means for associating said plurality of processes with said registration tokens.

69. The system of claim 61, further comprising means for dynamically changing said topology prior to said completing.

70. The system of claim 69, wherein said means for dynamically changing comprises means for adding a process to said topology, said process being added to one of at least one of said one or more logically dependent execution groups and a new logically dependent execution group, and wherein said process participates in said termination synchronization.

71. A system for managing concurrently executable computer processes, said system comprising:
- means for identifying a plurality of processes to be synchronized; and
- means for synchronizing completion of a termination phase of said plurality of processes, wherein each process of said plurality of processes is prevented from completing said termination phase until each process of said plurality of processes enters said termination phase signifying normal termination of processing for each process of said plurality of processes.

72. A computer program product comprising a computer usable medium having computer readable program code means therein for use in managing concurrently executable computer processes, said computer readable program code means in said computer program product comprising:
- computer readable program code means for causing a computer to affect identifying a plurality of processes to be synchronized; and
- computer readable program code means for causing a computer to affect synchronizing completion of a termination phase of said plurality of processes, wherein each process of said plurality of processes is prevented from completing said termination phase until each process of said plurality of processes enters said termination phase signifying normal termination for each process of said plurality of processes.

* * * * *

UNITED STATES PATENT AND TRADEMARK OFFICE
CERTIFICATE OF CORRECTION

PATENT NO.   : 6,487,580 B1
DATED        : November 26, 2002
INVENTOR(S)  : Bobak et al.

It is certified that error appears in the above-identified patent and that said Letters Patent is hereby corrected as shown below:

Column 13,
Line 22, delete "24" and insert -- 29 --

Signed and Sealed this

Twenty-second Day of April, 2003

JAMES E. ROGAN
*Director of the United States Patent and Trademark Office*